(12) United States Patent
Balaster

(10) Patent No.: US 10,566,599 B2
(45) Date of Patent: Feb. 18, 2020

(54) MODULAR POWER STORAGE AND SUPPLY SYSTEM

(71) Applicant: Ammon N. Balaster, Boulder, CO (US)

(72) Inventor: Ammon N. Balaster, Boulder, CO (US)

( * ) Notice: Subject to any disclaimer, the term of this patent is extended or adjusted under 35 U.S.C. 154(b) by 288 days.

(21) Appl. No.: 15/641,983

(22) Filed: Jul. 5, 2017

(65) Prior Publication Data

US 2018/0013124 A1  Jan. 11, 2018

Related U.S. Application Data

(60) Provisional application No. 62/358,188, filed on Jul. 5, 2016.

(51) Int. Cl.
*H01M 2/30* (2006.01)
*H01M 2/20* (2006.01)
*H01M 10/04* (2006.01)

(52) U.S. Cl.
CPC ............ *H01M 2/30* (2013.01); *H01M 2/202* (2013.01); *H01M 10/0481* (2013.01); *H01M 10/0486* (2013.01)

(58) Field of Classification Search
None
See application file for complete search history.

(56) References Cited

U.S. PATENT DOCUMENTS

| | | | |
|---|---|---|---|
| 7,074,517 B2 | 7/2006 | Higashino | |
| 8,257,855 B2 | 9/2012 | Ijaz et al. | |
| 8,815,429 B2 | 8/2014 | Hostler et al. | |
| 8,999,546 B2 | 4/2015 | Hostler et al. | |
| 2003/0194605 A1* | 10/2003 | Fauteux | H01M 2/26 429/149 |
| 2012/0156537 A1 | 6/2012 | Meintschel et al. | |
| 2012/0202109 A1* | 8/2012 | Seo | H01M 2/021 429/183 |
| 2013/0045401 A1* | 2/2013 | Yoon | B60L 58/24 429/90 |
| 2015/0303415 A1* | 10/2015 | Kayano | H01M 2/206 429/159 |
| 2018/0219261 A1* | 8/2018 | Drews | H01M 10/613 |

* cited by examiner

*Primary Examiner* — Rena Dye Cronin
(74) *Attorney, Agent, or Firm* — Thomas C. Saitta

(57) ABSTRACT

A modular power storage and supply system having a plurality of stacked frame members retaining a plurality of pouch cells, each of the frame members having a pair of pressure contact members abutting the cell tab terminals of the pouch cells, the pressure contact members and cell tab terminals being approximately equal in contact surface area, the frame members being separated by a gap, the system having a compression mechanism that applies pressure to the combination of pressure contact members and cell tab terminals.

8 Claims, 4 Drawing Sheets

MODULAR POWER STORAGE AND SUPPLY SYSTEM

This application claims the benefit of U.S. Provisional Patent Application Ser. No. 62/358,188, filed Jul. 5, 2016, the disclosure of which is incorporated herein by reference.

BACKGROUND OF THE INVENTION

This invention relates generally to the field of electrical power storage and supply systems or apparatuses, and more particularly relates to such systems or apparatuses that utilize batteries to store and deliver the electrical power. Even more particularly, the invention relates to such systems or apparatuses that utilize multiple batteries or cells arranged in a modular array.

In today's world people rely heavily on electricity to power everything from appliances, power tools, computers, radios, cell phones, even welders and other high-power tools and equipment. Also in today's world people are more mobile than ever before and they need their power devices in remote locations where AC wall sockets and electric utility mains are not available. Welding, for example, can be a big problem in remote locations and generally requires a gasoline or diesel powered engine driving an electrical generator, and a welding machine of electric conversion electronics to do the job. This equipment is generally big, expensive, heavy, and unwieldy. Operating power tools and appliances can be difficult in remote areas where the electricity grid access is not available. Other power devices are generally big, bulky, and heavy or they only deliver low amperage power. The invention is relatively small, portable and scalable, such that it can be easily carried to any location of use. Its efficient thermal and electronic design allows it to deliver the high amperage power needed for welding, starting engines, operating heavy equipment, and for many other applications.

Existing devices cannot provide high-current functionality. The current invention incorporates a modular cell-frame component structure that provides high current electrical interconnections for high energy cells, cell body pressure containment, thermal management, and high strength packaging integrated with battery management and other application specific power components for universal functionality. The high-current output of the system extends portable operations capabilities into many applications that are currently relegated to line power or generator connections. Key features of the invention include a high power density structure, a high-current electrical cell interconnection system which includes relatively large surface area, frame-mounted, cell terminal contact members abutting the cell tab terminals of the individual battery cells and maintained under high contact pressure, an integrated cell containment system required for high power and high energy density prismatic pouch cells, a rugged, impact resistant cell-frame and assembled battery enclosure, and a thermally efficient, stacked frame structure with inter-cell thermal conductive plates and pads conducting heat from cell bodies and electrical contacts to the frames and the outside air.

The invention defines and performs critical structures and functions required for a high-power electrical system, namely a particular individual cell structure, a high current cell electrical interconnect system, controlled cell pressure containment, impact resistant cell assembly enclosure, cell level thermal management, integrated battery management circuitry for safety and long life of the cells, an integrated enclosure for load control components, power connectors and control panel for application specific functionality, modular component design for ready adaptability for different applications and loads, and a stacking cell-frame design that provide for interconnection of any number of cells in parallel or series configurations.

The combined features of the current invention result in a high-current portable power system that extends remote power operations capability to applications that are currently relegated to line power or generator connections. This compact power system can provide useable electricity to operate AC or DC tools, appliances, and equipment, to charge battery powered tools and electronic devices, to power heavy duty tools and equipment, to jumpstart trucks and military equipment, provide backup or uninterruptable power, power an off-grid cabin or camp, even perform heavy duty welding repairs. The unit can be charged with electricity from any AC receptacle, vehicle lighter socket, generator, solar panels, or wind machine. The device provides useable electricity wherever it is needed in a lightweight portable power package. It is therefore a primary object of this invention to provide an improved modular power storage and supply system that is capable of providing high power electrical output in a relatively small, portable and scalable apparatus.

SUMMARY OF THE INVENTION

The invention in its embodiments generally comprises a modular, rechargeable, power storage and supply system, apparatus or device adapted to store and deliver high-current electrical power to high-current equipment or other devices. The system comprises a plurality of individual batteries or cells, each cell being associated with an interconnectable, stackable frame member. Each cell has a pair of generally rectangular cell tab terminals extending from one end of the cell, the cell and the cell tab terminals being disposed in substantially parallel planes, with the cell tab terminals being in different planes. The frame members are substantially rectangular with a relatively large open interior to receive and retain the cells. Each frame member comprises surface-disposed recesses adapted to receive cell tab pressure contacts such that, with the cell tab terminals disposed between adjacent frame members in the stacked array, each cell tab terminal is sandwiched between a pair of cell tab pressure contacts. Each of the frame-mounted cell tab pressure contacts is sized to be of equal or greater contact surface area than the cell tab terminals. A compression mechanism is provided to compress the stacked array of frame members, the design of the system being such that the compressive force is applied directly through each of the cell tab pressure contacts/cell tab terminal combinations.

DETAILED DESCRIPTION OF THE INVENTION

Figure 1:
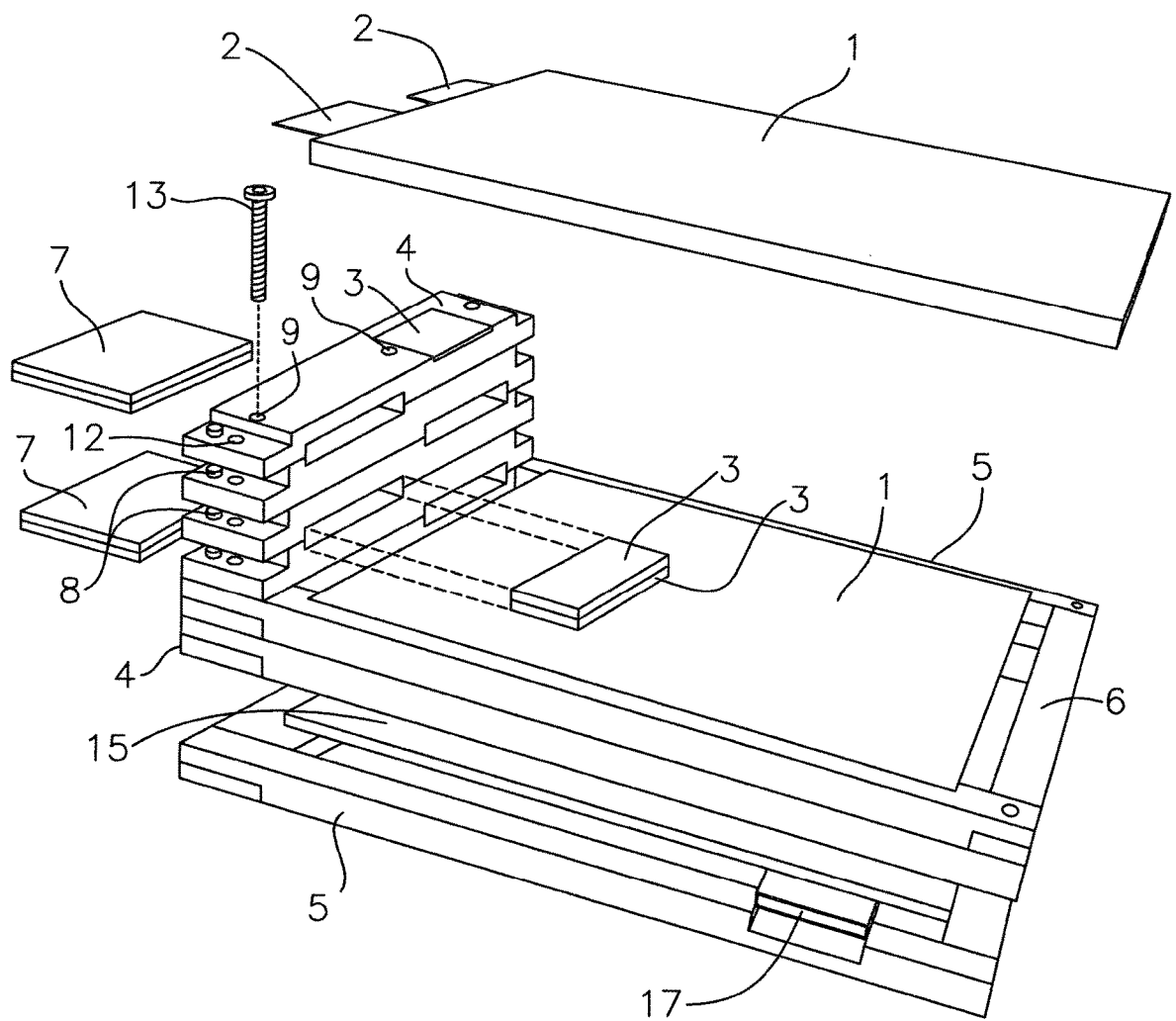
FIG. 1 is an expanded perspective view of an embodiment of the invention, with some duplicate elements not shown for clarity.

In general, the invention in its embodiments generally comprises a modular, rechargeable, power storage and supply system, apparatus or device adapted to store and deliver high-current electrical power to high-current equipment or other devices. The system comprises a plurality of individual batteries or cells, such as for example pouch-type lithium cells, each cell being associated with an interconnectable, stackable frame member. Each cell has a pair of generally rectangular cell tab terminals extending from one end of the cell, the cell and the cell tab terminals being disposed in substantially parallel planes, with the cell tab terminals being in different planes. The frame members are substantially rectangular with a relatively large open interior to receive and retain the pouch cells. Each frame member comprises surface-disposed recesses adapted to receive cell tab pressure contacts such that, with the cell tab terminals disposed between adjacent frame members in the stacked array, each cell tab terminal is sandwiched between a pair of cell tab pressure contacts. Each of the frame-mounted cell tab pressure contacts is sized to be of approximately equal surface area as the cell tab terminals. A compression mechanism is provided to compress the stacked array of frame members, the design of the system being such that the compressive force is applied directly through each of the cell tab pressure contacts/cell tab terminal combinations.

As used herein, the terms "battery" or "cell" may be used interchangeably to refer to the same type element. The terms "pouch battery" or "pouch cell" shall refer to a particular style of battery or cell having a generally thin, rectangular main body, soft or hard, and a pair of terminal cell tab terminals extending from one end of the main body, the terminals being generally thin and rectangular and disposed in parallel planes, but not co-planar. The term "system' shall be used as inclusive of a system, apparatus, device or the like. Directional terms such as "top", "bottom", "up", "down", "horizontal, "vertical", "front', "back" or the like shall be used to refer to the directions as represented in the illustrations, it being understood that actual orientation of the invention when operational is irrelevant.

With reference to the illustrations for descriptive purposes, wherein elements are provided with reference numerals corresponding to the test reference numerals, the invention will now be described in detail. The illustrations are meant to be illustrative and descriptive, but are not intended to limit the possible embodiments and/or scope of the invention as claimed.

The modular power storage and supply system comprises in general a plurality of stackable, interconnectable, frame members 20, the frame members 20 being generally rectangular and having a short height dimension relative to the lateral dimensions. A representative but non-limiting example of a frame member 20 may have, for example only, a vertical height of approximately 0.5 inches with a horizontal length of approximately 13 inches and a horizontal width of approximately 8.5 inches. The frame member 20 comprises thin structural elements, i.e., rail members, disposed along its perimeter such that a relatively large open interior is defined. The frame member 20 may be provided as a four-sided monolithic member, a three-sided single-body member joined to a frame interconnector block 4, or, as illustrated, an assembly comprising the combination of two side frame rails 5, an end frame rail 6 and a frame interconnector block 4. The frame member 20 is composed of a non-conductive, electrically insulating material, such that passage of current through and between adjacent frame members is accomplished by electrically conductive members, e.g., high current wires, cables, conduits, bus bars, etc., disposed within or externally adjoining the frame members 20.

Figure 2:
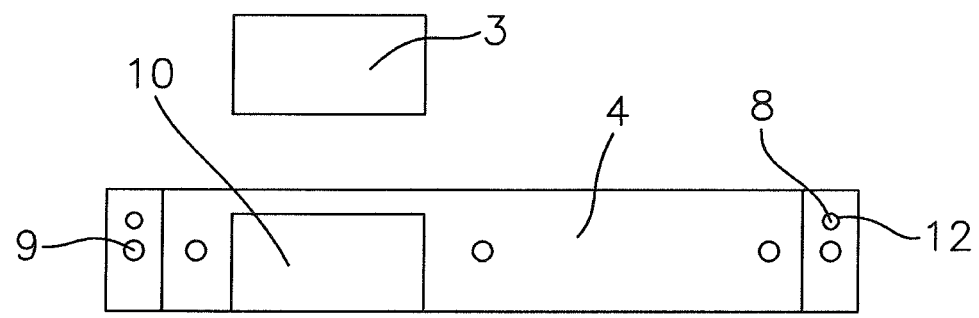
FIG. 2 is an expanded top view of an embodiment of a frame interconnector block and cell tab pressure contact.
Figure 3:
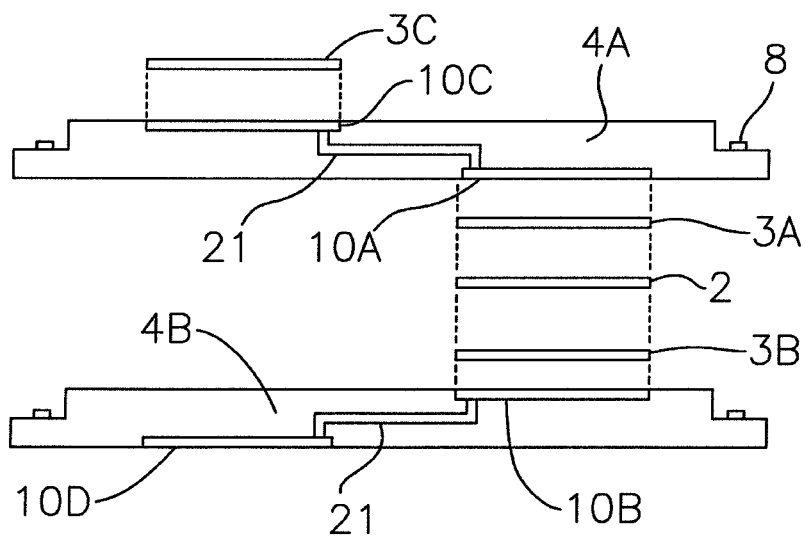
FIG. 3 is an expanded side view illustrating an adjacent pair of frame interconnector blocks and cell tab pressure contacts.
Figure 4:
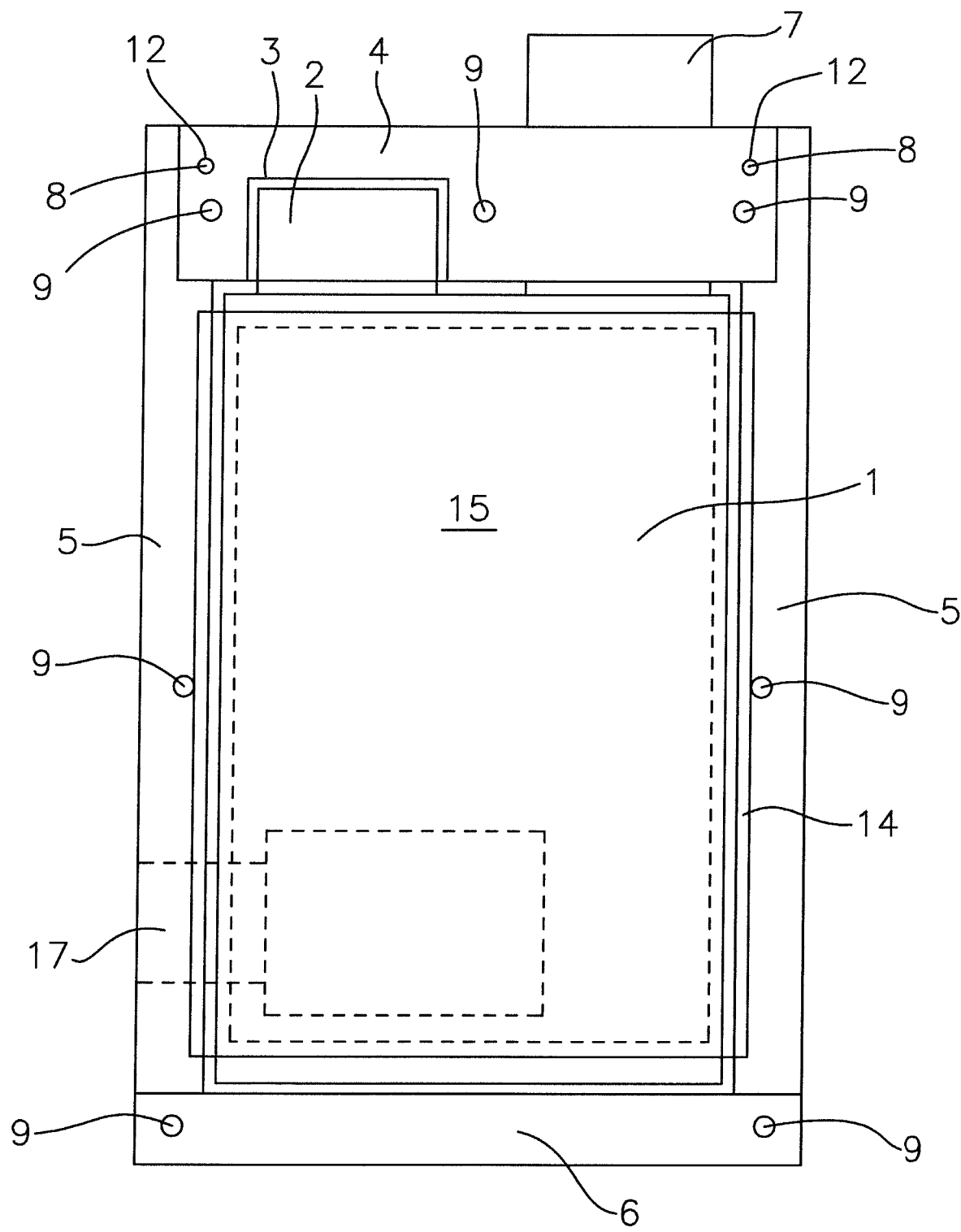
FIG. 4 is a top view of an embodiment of the invention, with certain internal components illustrated in exposure.
Figure 5:
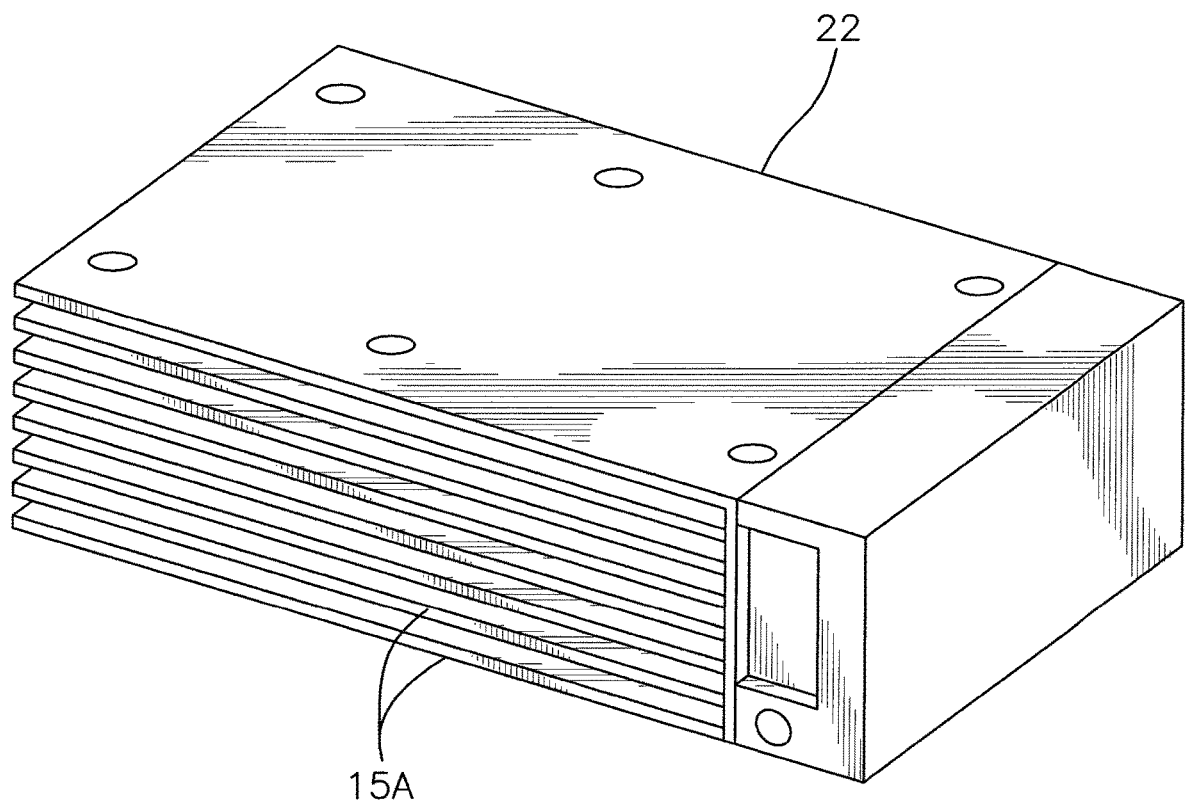
FIG. 5 is a perspective view of an embodiment of the invention illustrating external thermal fins.

As seen in the embodiment illustrated in FIGS. 1-3, the ends of the side frame rails 5, end frame rail 6 and frame interconnector block 4 are preferably provided with mating mortise-and-tenon type structures and with mating frame alignment pins 8 and alignment holes 12 to insure rectilinear alignment. The frame members 20 are each adapted to receive a generally rectangular, thin in height, pouch cell 1, sometimes referred to as a prismatic cell, within the open interior of the frame member 20, thereby defining a battery subunit. Extending from one end of the pouch cell 1 is a pair of cell tab terminals 2, one positive and one negative, the cell tab terminals 2 being generally rectangular and thin in height, such that the surface area of the top and bottom surfaces is greater (on the order of at least 3 times) than the surface area of the edges. The cell tab terminals 2 are positioned in parallel planes, but not co-planarly, such that one cell tab terminal 2 is located higher than the other cell tab terminal 2. Dimensions for a representative but non-limiting cell tab terminal 2 may, for example only, be approximately two inches by one inch horizontally with a vertical thickness of approximately 0.1 inches.

The frame interconnector block 4 is structured to receive and retain the cell tab terminals 2 of the pouch cell 1. The frame interconnector block 4 comprises a pair of contact recessed lands 10, one cut into the upper surface and the other cut into the lower surface of the frame interconnector block 4, the recessed contact lands 10 corresponding in horizontal and vertical positioning to the horizontal and vertical positioning of the pair of cell terminal tabs 2 on a pouch cell 1. Preferably, the height/depth of the recessed contact lands 10 is preferably chosen such that, with a pouch cell 1 positioned within the frame member 20, the cell terminal tabs 2 will extend fully horizontally into the recessed contact lands 10 and be received at least partially in the vertical direction within the recessed contact lands 10 of the frame interconnector block 4, with the main body of the frame interconnector block 4 being disposed between the cell terminal tabs 2 of the pouch cell 1.

An electrically conductive, generally rectangular, cell tab pressure contact member 3 is disposed within each recessed contact land 10 so as to abut the cell tab terminals 2 of the pouch cell 1 when the modular array of frame members 20 and pouch cells 1 is assembled. Each pressure contact member 3 is horizontally dimensioned to be approximately equal to the horizontal dimensions of the cell tab terminals 2, such that the contact surface areas of the pressure contact members 3 and the cell tab terminals 2 are approximately equal. The recessed contact lands 10 on adjacent frame interconnector block 4 alternate front to back on the upper and lower surfaces when the modular system is assembled. As shown best in FIG. 3, for the adjacent combination of an upper frame interconnector block 4A and a lower frame interconnector block 4B, the recessed contact land 3A on the lower surface of the upper frame interconnector block 4A faces and coordinates with the recessed contact land 3B on the upper surface of lower frame interconnector block 4B. The combination of recessed contact lands 10A and 10B defines a cavity that receives the combination of a cell tab terminal 2 positioned between an upper pressure contact member 3A and a lower pressure contact member 3B, with the cell tab terminal 2 begin at least partially positioned within the cavity in the vertical direction.

In this manner, the recessed contact land 10C on the upper surface of upper frame interconnector block 4A, being forwardly disposed relative to the rearwardly disposed lower recessed contact land 10A, receives a lower pressure contact member 3C and will correspond to a forwardly disposed lower recessed contact land 10 on a frame interconnector block 4 assembled atop the frame connector block 4A (not shown). Likewise, the forwardly disposed lower recessed contact land 10D will correspond to a forwardly disposed upper recessed contact land 10 on a frame interconnector block 4 assembled atop the frame connector block 4A (not shown).

The vertical thickness dimension of the combined upper pressure contact member 3A, lower pressure contact member 3B and cell tab terminal 2 is greater than the overall vertical dimension of the cavity formed by the combination of recessed contact lands 10A and 10B, such that when frame interconnector blocks 4A and 4B are vertically stacked, a small gap is present between the lower surface of frame interconnector member 4A and the upper surface of frame interconnector member block 4B. The vertical dimensions of the recessed contact lands 10A and 10B may differ, such that one is deeper than the other, and further such that the external surfaces of one or both of the pressure contact members 3A/3B may even be flush with the surface of the frame connector blocks 4A/4B.

The modular system is provided with a compression mechanism, device or assembly adapted to provide vertical pressure to the frame interconnector members 4 of the assembled stack of frame members 20 so as to apply direct pressure onto and between each combination of the pressure contact members 3 and cell tab terminal 2. The compression mechanism may comprise any suitable mechanism capable of applying pressure to the assembly, such as for example clamping mechanisms, but a preferred compression mechanism as illustrated comprises a plurality of compression jackscrews 13 inserted into vertically aligned jackscrew bores 9 positioned in each frame interconnector block 4, and preferably in other portions of the frame member 20. Once the frame members 20 are vertically assembled, the compression jackscrews 13 are tightened to maximum tightness, thereby pressing the frame interconnector blocks 4 against the pressure contact members 3 and thus the pressure contact members 3 against the cell tab terminals 2, the gaps present between adjacent frame interconnector blocks 4 insuring that all vertical pressure from the compression mechanism is transferred through the pressure contact members 3 onto and through the cell tab terminals 2.

Electrical connectors 21 deliver current from one of the pressure contact members 3 to the other pressure contact member 3 for each frame interconnector block 4. The electrical connectors 21 may be internally or externally disposed, and may comprise for example wire, cable or rod conductors, bus bars or the like. The composition, size and transmission characteristics of the electrical connectors 21 are chosen to minimize resistance or any other current loss factor while maximizing current delivery.

The combination of maximum pressure on the pressure contact members 3 and the cell tab terminals 2 and equalized surface contact area between the pressure contact members 3 and the cell tab terminals 2 minimizes resistance losses and maximizes current transfer through the assembly. With this structure, high power currents of 300 or more Amperes are able to be delivered.

The modular assembly further comprises battery terminal contacts 7 which extend from the assembly for connection to equipment or other devices receiving power from the assembly. The battery terminal contacts 7 are shown as being tab members, but alternative configurations or structures for the terminal contacts 7 may be utilized, such as for example pigtail-type connectors. As the system is rechargeable, a load control/charging connector port 17 is provided to receive externally generated power to recharge the pouch cells 1.

As shown, the cell tab terminals 2 of the individual pouch cells 1 are connected in series (negative to positive), but the modular assembly could be alternatively structured such that the cell tab terminals 2 are connected in parallel (positive to positive, negative to negative) by altering the course of the electrical connectors 21.

Any number of frame members 20 and pouch cells 1 may be utilized depending on power needs. The assembled frame members 20 are disposed within a rugged and sturdy housing 22 which may comprise upper and lower compression plates, handles, strap mounts, wheel mounts or other components. Most preferably, inter-cell thermally conductive plates and/or pads 15 are positioned between adjacent pouch cells 1, to transfer heat from the cells 1 to the frame members 20 and/or to the ambient in order to increase battery efficiency and reduce negative thermal effects. The thermally conductive plates and/or pads 15 may be provided with externally protruding fin members 15A to increase thermal release.

The modular power storage and supply system as described may further comprise load control systems, power inversion (DC to AC) systems, operational controls, USB ports, fans, battery management systems, and/or other known systems and accessories common to battery systems.

It is contemplated that substitutions and equivalents for some elements described above may be obvious to those of skill in the art, and therefore the true scope and definition of the invention shall be as set forth in the following claims.

I claim:

1. A modular power storage and supply system comprising:
    a plurality of pouch cells, each of said pouch cells comprising a pair of cell tab terminals each having a pair of contact surface areas;
    a plurality of interconnected frame members, each of said frame members being adapted to retain one of said pouch cells, each of said frame members comprising a pair of pressure contact members each having a contact surface area, said pair of pressure contact members disposed in contact with said pair of cell tab terminals, and wherein said frame members are interconnected such that a gap exists between adjacent frame members;
    wherein each said frame member comprises a frame interconnector block comprising recessed contact lands, and wherein said pressure contact members are disposed in said recessed contact lands; and
    a compression mechanism, wherein said compression mechanism applies pressure to said interconnected frame members onto and through said pressure contact members and said cell tab terminals.

2. The system of claim 1, wherein said frame interconnector block is disposed between said pair of cell tab terminals.

3. The system of claim 1, wherein said compression mechanism comprises one or more compression jackscrews positioned in a plurality of aligned compression bores disposed in said frame members.

4. A modular power storage and supply system comprising:

a plurality of pouch cells, each of said pouch cells comprising an end and a pair of cell tab terminals each having a pair of horizontal contact surface areas, said cell tab terminals extending from said end and disposed in parallel but different planes, the horizontal dimensions of said cell tab terminals being greater than the vertical dimension;

a plurality of frame members connected in a vertical stack, each of said frame members being adapted to retain one of said pouch cells, each of said frame members comprising a frame interconnector block having a pair of pressure contact members each having a horizontal contact surface area, the horizontal dimensions of said pressure contact members being greater than the vertical dimension, said pair of pressure contact members disposed in contact with said pair of cell tab terminals, such that said frame interconnector block is disposed between said cell tab terminals, and wherein said frame members are interconnected such that a horizontal gap exists between adjacent frame members; and a compression mechanism, wherein said compression mechanism applies vertical pressure to said frame interconnector blocks so as to compress the combinations of said pressure contact members and said cell tab terminals.

5. The system of claim 4, wherein said frame interconnector blocks comprise recessed contact lands, and wherein said pressure contact members are disposed in said recessed contact lands.

6. The system of claim 4, wherein said compression mechanism comprises one or more compression jackscrews positioned in a plurality of aligned compression bores disposed in said frame interconnector blocks.

7. A modular power storage and supply system comprising:

a plurality of pouch cells, each of said pouch cells comprising a pair of cell tab terminals each defining a surface contact area;

a plurality of interconnected frame members, each of said frame members being adapted to retain one of said pouch cells, each of said frame members comprising a pair of pressure contact members retained within a pair of recessed contact lands, each said pressure contact member defining a contact surface area and disposed in contact with one of said cell tab terminals;

wherein for adjacent frame members, the combined thickness of said cell tab terminals and said pressure contact members is such that a gap exists between adjacent frame members; and a compression mechanism, wherein said compression mechanism applies pressure to said frame members so as to compress each combination of said pressure contact members and said cell tab terminals.

8. The system of claim 7, wherein said compression mechanism comprises one or more compression jackscrews positioned in a plurality of aligned compression bores disposed in said frame members.

* * * * *